(12) United States Patent
Youn

(10) Patent No.: US 8,392,137 B2
(45) Date of Patent: Mar. 5, 2013

(54) METHOD AND APPARATUS FOR TESTING RFID TAGS FOR MASS PRODUCTION

(75) Inventor: Tai Won Youn, Albuquerque, NM (US)

(73) Assignee: Amtech Systems, LLC, Albuquerque, NM (US)

(*) Notice: Subject to any disclaimer, the term of this patent is extended or adjusted under 35 U.S.C. 154(b) by 562 days.

(21) Appl. No.: 12/705,083

(22) Filed: Feb. 12, 2010

(65) Prior Publication Data

US 2011/0202299 A1    Aug. 18, 2011

(51) Int. Cl.
*G01D 18/00* (2006.01)

(52) U.S. Cl. ........................................... 702/85
(58) Field of Classification Search .................. 702/85
See application file for complete search history.

(56) References Cited

U.S. PATENT DOCUMENTS 6,104,291 A * 8/2000 Beauvillier et al. ....... 340/572.1

OTHER PUBLICATIONS

Daniel Deavours, Ph.D., "How the Lab Tests Were Conducted." RFID Journal, Dec. 1, 2004 downloaded Jun. 23, 2010 at (http://www.rfidjournal.com/article/articleview/1256).
Pavel V. Nitikin, et al., "Theory and Measurement of backscattering from RFID Tags." IEEE Antennas and Propagation Magazine, vol. 48, No. 6, pp. 212-218, Dec. 2006.

* cited by examiner

*Primary Examiner* — Stephen Cherry
(74) *Attorney, Agent, or Firm* — Caesar, Rivise, Bernstein, Cohen & Pokotilow, Ltd.

(57) ABSTRACT

A testing system and method for testing glass-mounted RFID tags such as tags mounted on vehicle windows. A testing carrier for use in a test chamber simulates the effect on the tag of the mounting glass. The test chamber and carrier are calibrated by first mounting the tag on the test carrier and making sensitivity measurements and then mounting the tag on glass that is representative of the actual production environment. Comparisons are made between the two measurements and calibration factors are derived to compensate for differences between the actual mounting glass and the test carrier. The test carrier is designed to provide uniform pressure against the tag to minimize any distortions that would alter the sensitivity of the tag.

13 Claims, 6 Drawing Sheets

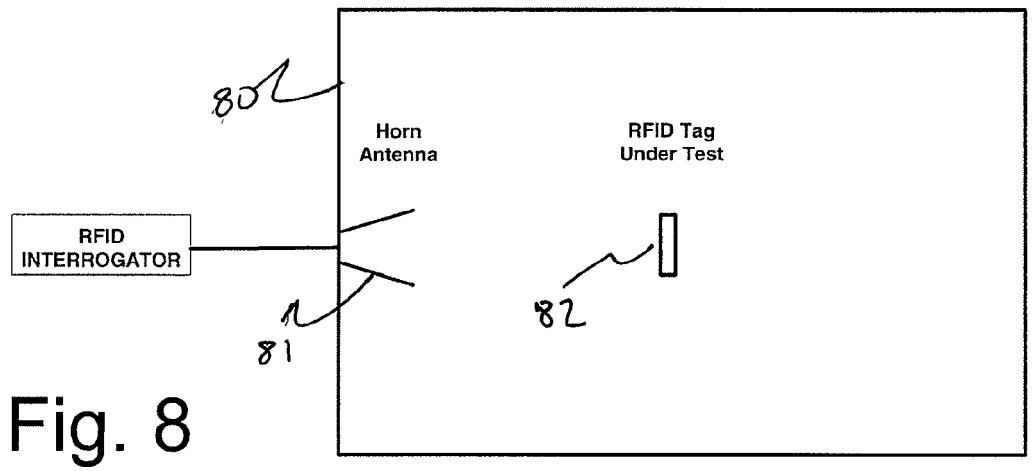
Fig. 8
Reference Anechoic Chamber Size: 88" (H) x 88" (W) x 124" (L)
Fig. 9
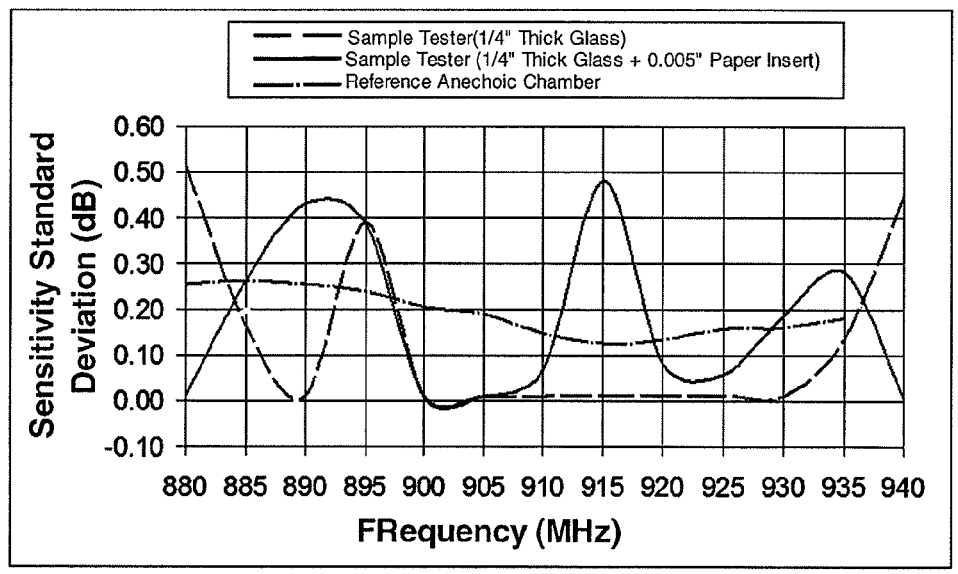

METHOD AND APPARATUS FOR TESTING RFID TAGS FOR MASS PRODUCTION

FIELD OF THE INVENTION

This invention relates generally to RFID tags and more particularly to non-destructive testing of these tags.

BACKGROUND OF THE INVENTION

A new sample testing technology is developed that would allow manufacturing to test RFID tag samples for mass production in a non-destructive process that is as effective as conventional testing that uses a destructive process.

TransCore produces millions of RFID tags every year for highway toll collections, where the RFID tags are attached on the windshield inside vehicles. The accuracy of testing tags requires careful considerations, since RFID performance is very sensitive to the care of installation and glass thickness. In other words, accurate installation and glass thickness should be considered as part of the antenna.

RFID tags are made of a number of thin plastic layers on which are printed antennas and to which are attached an ASIC and adhesive backing for the customer to install the tags in the windshield permanently. The RFID tags weigh 2 grams and measure approximately 3.119" (L)×2.647" (W)×0.014" (Thick, approximately 0.050" at ASIC). The tag consists of a laminate of multiple layers of polymer films, inks, and adhesive materials. The ASIC in a thin small-shrink outline package (TSSOP) is contained within the layers. The tag stack-up is described in the following table.

TABLE 1

Tag Structure

| Layer | Description |
| --- | --- |
| (Driver Side) | — |
| Label | White Polyethylene Terephthalate (PET), self-adhesive, applied by TransCore |
| Over-laminate | White vinyl, self-adhesive |
| Solder | Eutectic Sn/Pb, No Clean |
| Immersion Silver | Applied to Copper surfaces on chip side of tag to prevent corrosion and enhance solderability |
| Laminate | Copper |
| | Adhesive |
| | PET |
| | Adhesive |
| | Copper |
| Organic Surface Protectant | Applied to Copper surfaces on antenna side of tag to prevent corrosion |
| Flood Coat Ink | 2 coats, UV-cure, white in color, and either 1 coat, UV-cure, white in color, or 1 coat, UV-cure, customer-specified color |
| Optional Graphic Ink | Applied by Pad Printing |
| PSA | Remove native release liner |

FIG. 1 shows how it looks when an RFID tag 10 is installed inside the windshield. FIG. 1 shows the tag 10 having a label 15 and a chamfered corner 16.

The challenge in producing such high volume product is how to ensure that RFID tags sent to customers meet the performance requirements at the operating conditions.

SUMMARY OF THE INVENTION

In accordance with one aspect of the invention there is provided a carrier assembly for testing RFID tags. The carrier assembly includes a flat carrier with a cut-out to match the shape of the tag, a bottom glass plate, a flat spacer having a spacer cut-out that the tag fits into, a resilient insert that fits inside said spacer cut-out, a top glass plate and a plate fastener. The bottom glass plate is placed over the carrier cut-out; the spacer is placed on top of the bottom plate with the spacer cut-out generally aligned with the carrier cut-out; the tag is placed inside said spacer cut-out; the resilient insert is placed on top of the tag; and the top glass plate is placed on top of the spacer and the resilient insert. The plate fastener compresses said flat carrier against the bottom glass plate, the bottom glass plate against the spacer and the tag, and the spacer and the resilient insert against the top glass plate. In a further embodiment, the spacer is thicker than the tag thickness and the combination of the thickness of the resilient insert and the tag is greater than the thickness of the spacer. In a further embodiment, the resilient insert provides a generally uniform pressure across the tag to produce consistent mechanical contact between the bottom glass and the tag. In a further embodiment, the resilient insert is made of a material selected based on its dielectric properties so as to have a minimal effect on the tag at the tag's operating frequency.

In accordance with another aspect of the invention there is provided a tag testing system having a tag carrier, an RF anechoic testing chamber, an antenna; and a tag interrogator. According to this aspect, the tag is placed on the tag carrier inside the testing chamber and a signal is transmitted to the tag through the antenna by the tag interrogator and a signal is received from the tag by the interrogator through the antenna to measure tag sensitivity. In a further embodiment, the anechoic testing chamber is characterized with calibration constants at a plurality of frequencies. In a further embodiment, chamber calibration constants are established by comparing measurements made in the anechoic testing chamber to measurements made in a reference testing site.

In accordance with another aspect of the invention, there is provided a method for testing glass-mounted RFID tags. The method includes the steps of: measuring a first sensitivity of a sample RFID tag on a test carrier without adhering the tag to glass to obtain a first sensitivity, mounting the sample RFID tag to glass, measuring a second sensitivity of the sample RFID tag adhered to the glass, deriving a calibration factor to relate the first and second sensitivities, measuring a production sensitivity of a production RFID tag on the test carrier; and applying the calibration factor to the production sensitivity.

BRIEF DESCRIPTION OF THE DRAWINGS

FIG. 8 is a an illustration of a reference anechoic chamber set up for RFID tag development;

FIG. 9 is a graph showing sensitivity standard deviation for two sample testers and a reference anechoic chamber.

DETAILED DESCRIPTION OF THE PREFERRED EMBODIMENT

A sample testing concept has been chosen, since it is not practical to test every tag in large volume production. The next hard question is how to test sample RFID tags under the operating condition without destroying them, since once a tag is permanently installed on a windshield glass for testing, that tag is no longer usable for a customer, because the tag will be damaged when it is removed from the glass.

A simple test method might include;
Step-1 Install the tags on the glass permanently.
Step-2 Test.
Step-3 Remove the tags from the glass to recycle the glass.
Step-4 Return to Step 1.

The above destructive test method of removing the permanently installed tags from the glass takes a lot of manpower in a manufacturing environment. These difficulties have led to the non-destructive sample testing method.

Figure 7:
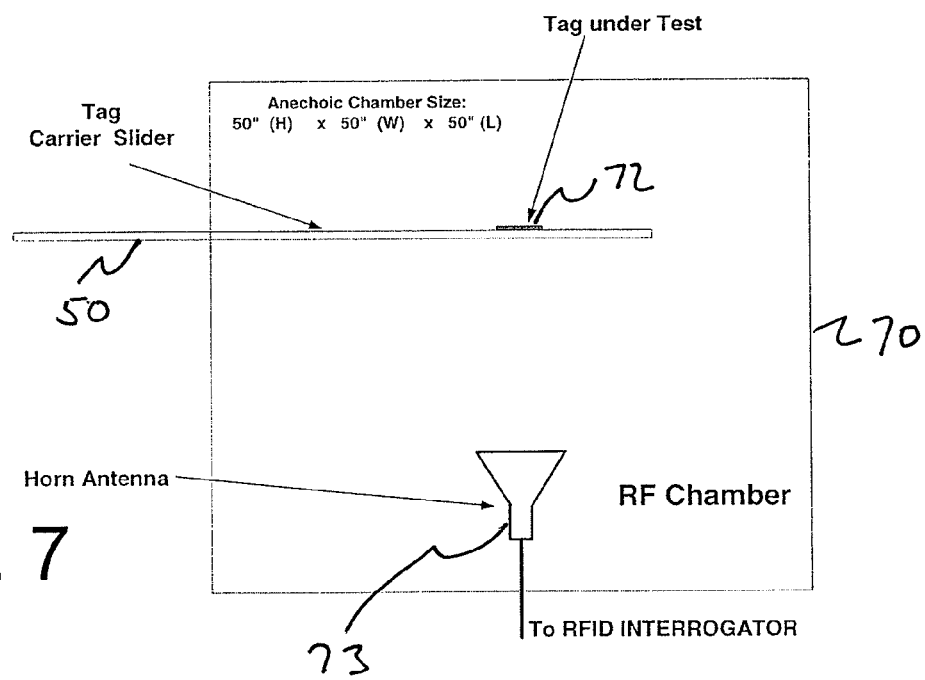
FIG. 7 is an illustration of a sample test chamber for RFID tag testing.

There are two test set-ups involved to develop the entire testing system for mass production of RFID tags. One is the sample test chamber set-up for manufacturing as shown in FIG. 7 and the other is the reference anechoic chamber setup for engineering as shown in FIG. 8. The manufacturing set-up is smaller and suited to a manufacturing environment. FIG. 7 shows the test chamber 70, having a horn antenna, 73 and a tag carrier 50 holding a tag under test 72. The much larger reference anechoic chamber is shown in FIG. 8, having a horn antenna 81 and a tag under test 82.

Both test set-ups have the interrogator antenna connected to the chamber to send the interrogation signal to the tag under test through microwave propagation. The interrogator increases the interrogation signal level from low level (i.e. 0 dBm) until the interrogator detects valid data out of the tag responding signal to determine the tag sensitivity from the returned signal level and a predetermined look-up table of a calibration file representing the propagation loss and the interrogation antenna gain at the particular frequency.

The first step of development is to select a minimum of 30 sample tags from manufacturing production randomly, to test sample tags using the trial calibration file of the sample test chamber set-up, and to analyze the sensitivity data to find the average and the standard deviation over the test frequency range.

The second step of development is to install each sample tag on the glass permanently, to test individually the 30 sample tags from step 1 on the glass using the reference anechoic chamber set-up, and to analyze the sensitivity data to find the average and the standard deviation over the test frequency range.

The third step is to find an adjustment for the trial calibration file of the Sample Tester by comparing the two set of data such that the two test results would be same as each other within acceptable tolerance.

The last step is to update the calibration file and to test run for the regular RFID tags in the production floor to ensure that the tag sensitivities within the specifications.

The description so far might indicate that the overall test set-up development is a straight-forward task. However it was found that making an accurate measurements bring a lot of difficult RF/microwave questions that require to understand the RF mismatch at the antenna feed point, the interactions among the antenna, tag, and anechoic chamber through reflections and the accurate propagation loss from the antenna feed point to the exact position of the tags under test.

Important aspects of the disclosed system and method include calibrating the test set-up, providing a constant level of pressure between the tag and the top glass, and designing the stack-up of the tag carrier slider assembly shown in FIG. 6.

Regarding the calibration, the horn antennas attached to the chamber are normally characterized in far field (i.e. >50 wavelength) applications where scattering reflected signals are attenuated enough (i.e. >20 dB) for the line-of-sight signals. However the RFID manufacturing environment cannot afford such a large test set-up. A solution has led to the test set-up with an anechoic chamber. The reflection signals from the anechoic chamber walls are considerable within the required signal accuracy (i.e. <+/−0.5 dB) for the line-of-sight signals. This might explain why a large chamber was found to produce more accurate measurements compared to small ones. The size of the sample test chamber (measuring 50" (H)×50"×50" (L)) made it difficult to find a correct size horn antenna with a good match to use at 915 MHz (wave length 13"). Therefore a small horn antenna was chosen, despite the poor match that would cause severe ripples in the measurements over the frequency range. Another issue is to determine the propagation distance from the horn antenna to the tags in order to calculate the propagation loss, since the correct phase center of the horn antenna depends on the operating frequencies.

As a result of investigation into these difficulties it was found that it would be more practical to measure the total forward transmission loss (S21) from the antenna feed point to the tag position using either a network analyzer or field strength meter rather than to calculate the propagation loss based on the published antenna data, theoretically calculated phase center, and unknown interactions among the antenna, tags, and the chamber.

Figure 6A:
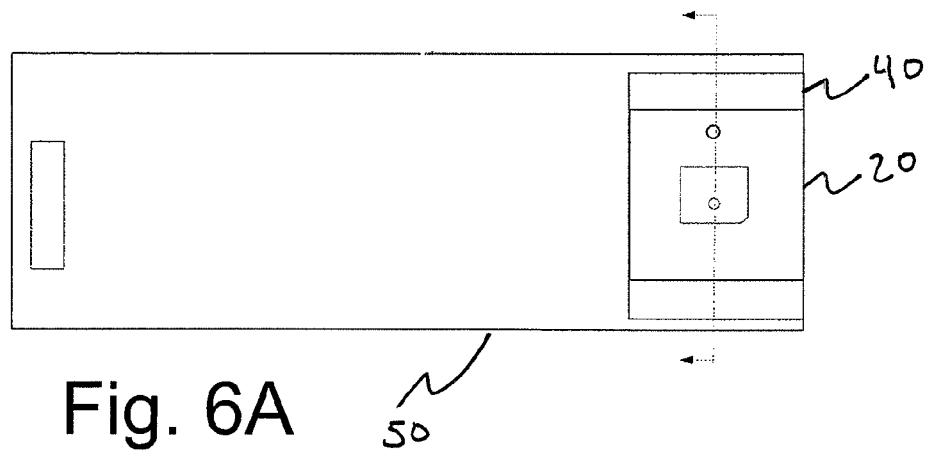
FIG. 6A is a top plan view of the final tag carrier slider assembly.
Figure 6B:
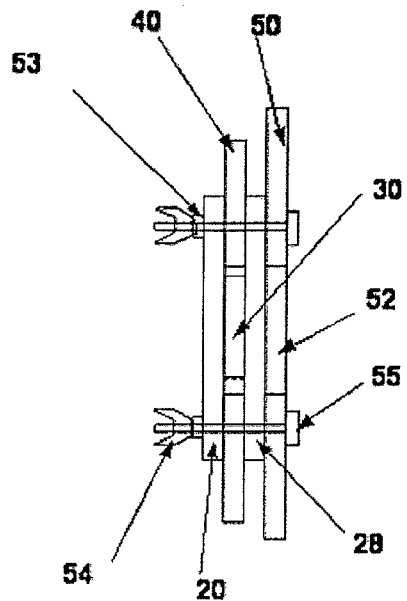
FIG. 6B is a sectional view of the final tag carrier slider assembly taken along the section line shown in FIG. 6A.

The next thing to consider is how to determine the stack-up of the tag carrier slider assembly, shown in cross-section in FIG. 6B. It was found that the mechanical details of how the tag is placed on the tester, and the dielectric constants and thickness of the stack-up material all affect the consistency of the sensitivity measurement over the operating frequency range. Various carrier configurations were tried, with the criteria for success being the lowest standard deviation for sensitivity measurements across a representative sample of tags. A desirable stack-up would show a best standard deviation compared to that of the reference anechoic chamber at the operating frequency range which is from 902 MHz to 928 MHz for U.S. operation as shown in FIG. 9. It was discovered that mechanically consistent and correct tag placements on the tester cannot be over-emphasized for measurement accuracy and consistency, because the mechanical condition is translated to electrical performance. FIG. 9 shows a significant change in standard deviation pattern and magnitude when a 0.005" thick sheet of paper is inserted between the top glass and the resilient insert.

The sample tester program compares the test data with the pass/fail limits at each test frequency to decide if a particular tag passes the performance requirements. The pass/fail limits are normally determined by adding to and subtracting from the average three times the standard deviation for the upper and lower limits respectively. The FIG. 9 also indicates the sensitivity standard deviation of the sample tester with and without a paper insert (0.005" thick) between the tag and the top glass.

Figure 1:
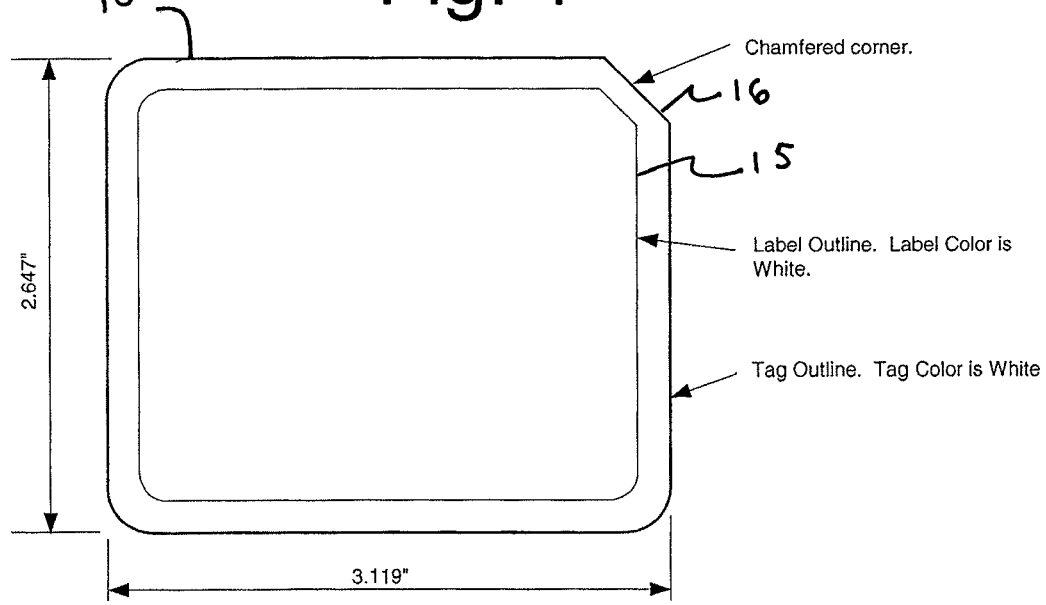
FIG. 1 is a front elevation view of an RFID tag installed inside the windshield of a vehicle.
Figure 2:
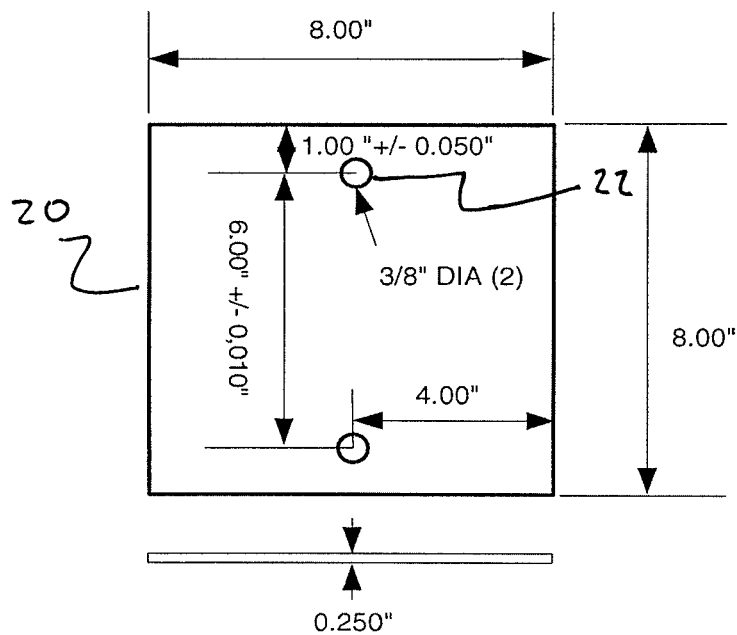
FIG. 2 is a top plan view of one of the two layers of glass in the stack-up.
Figure 3:
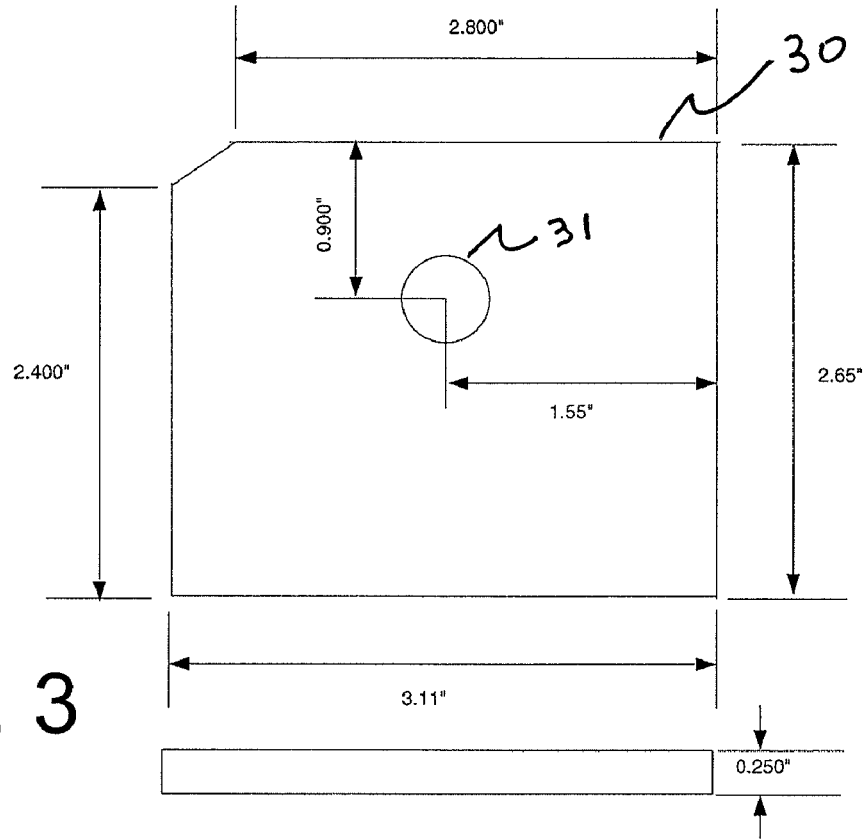
FIG. 3 is a top plan view of a foam layer of the stack-up.
Figure 4:
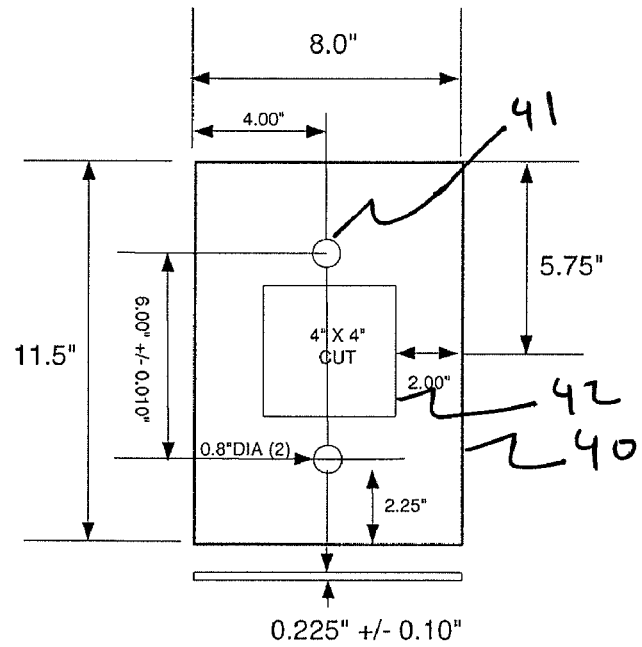
FIG. 4 is a top plan view of a spacer layer of the stack-up.
Figure 5:
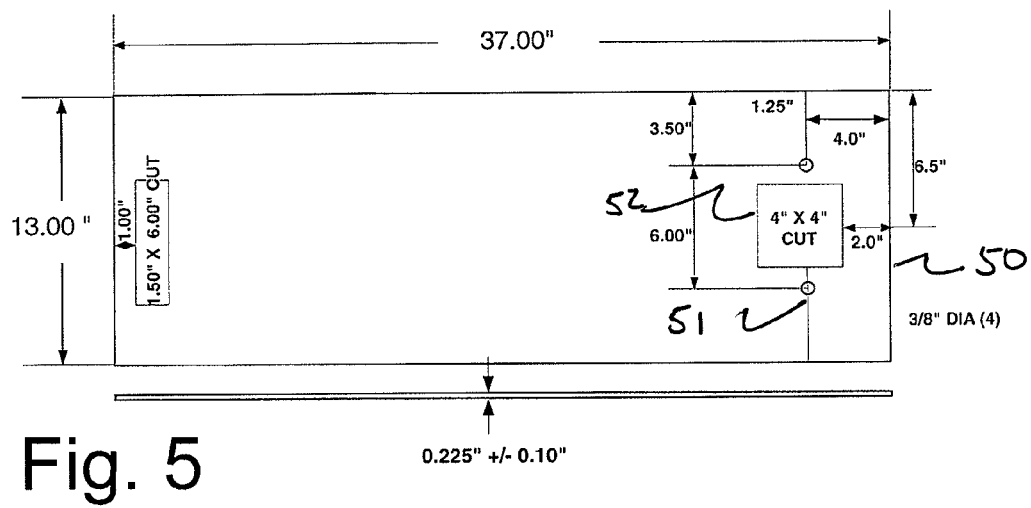
FIG. 5 is a top plan view of a carrier layer of the stack-up.

With reference to FIG. 6B, the spacer 40, the resilient foam insert 30, and the wings nuts 54 are chosen to achieve consistent tag placement. The tag sensitivity was found to change with the pressure between the tag and the top glass 20. It is noted that a circular cut-out 31 was made out of the foam 30 shown by FIG. 3 to align the ASIC that is part of the tag under test on the hole 31 to provide uniform contact, because without the hole in the foam, an air-bubble around the ASIC was causing significant changes in the sensitivity from tag to tag. FIG. 2 shows a representative glass 20 which could be the top glass 20 or the bottom glass 28 in FIG. 6. The glass 20 has holes 22 for nylon screws (FIG. 6B, 55) that, along with nylon wing nuts 54, hold the entire testing assembly together. FIG. 3 shows the resilient foam insert 30 having a hole 31 for the ASIC in the tag. FIG. 4 shows the spacer 40 with a cut out 42 into which fits the foam 30 and a tag under test. The spacer 40 also has holes 41 for the previously-mentioned nylon screws. FIG. 5 shows the tag testing carrier 50, with a cut out 52 and holes for the nylon screws 51. In an exemplary embodiment, the carrier 50 and spacer 40 are made of polycarbonate. The resilient foam 30 is made of microcellular urethane foam. In an exemplary embodiment, the foam is Poron, made by Rogers Manufacturing Corporation.

The pressure built by the compressed foam 30 can be controlled by the gap between the tag and the top glass 20. The gap reduces from approximately 0.020" to 0.00", when the top glass touches the spacer while tightening the wing nuts. In other words, the combined function of the spacer, foam, top glass and wing nut produces the constant pressure required for consistent and repeatable mechanical placement for the tag on the tester.

Finally the stack-up of the tag slider shown in FIGS. 6A and 6B would enable manufacturing to test the RFID tag samples without the destructive process that is required for the reference anechoic chamber set-up to produce the correct test results.

With reference to FIG. 6B, the final stack-up on the test carrier consists of two pieces of glass 20, 28; foam 30; spacer 40; and carrier 50. Not shown in that figure is the tag under test, itself. The tag under test would be sandwiched between the foam 30 and bottom glass 28.

The foam 30 provides uniform pressure across the tag for dependable and consistent mechanical contact between the top glass and the tag under test. The tag carrier slider 50 with the tag under test 72 is placed inside the sample tester 70 as shown in FIG. 7. Testing the next tag is achieved by pulling the slider 50 out of the chamber 70, removing the top glass 20, replacing the tag 72, putting back the top glass, and pushing the slider back into the chamber. The process repeats for further samples to ensure that the tags products meet the performance requirements.

During manufacturing, the RFID tags are programmed through radio communication with an ECATT (Electronic Computer Aided Tag Tester) and sampled (i.e. one for every 1000 tags) for sensitivity tests at the sample tester. Programming by the ECAAT verifies the important radio communication link between the tags and the interrogator, while the tag sensitivity is more accurately verified by the sample tester.

Figure 10:
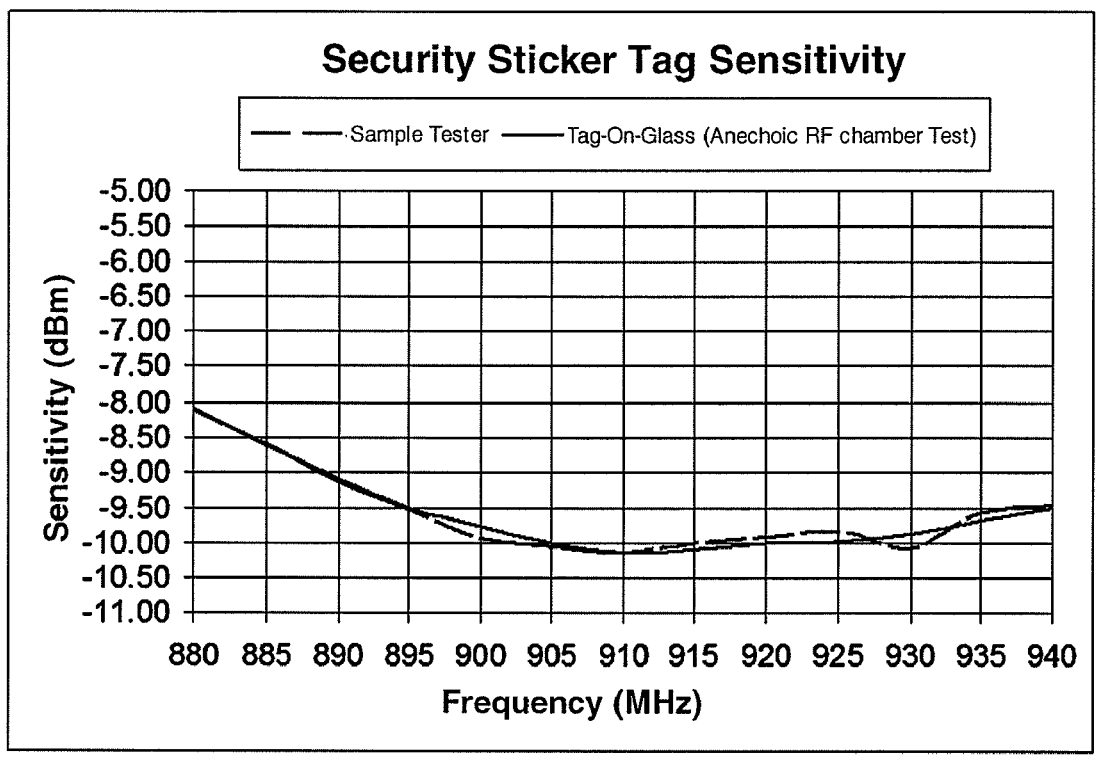
FIG. 10 is a graph of security sticker tag sensitivity comparing a sample tester and tag on glass data from an anechoic RF chamber test.

Once the calibration is completed, then the sample tester can produce the test results practically as good as the reference anechoic test set-up can produce with the tag-on-glass as shown by FIG. 10

Without further elaboration the foregoing will so fully illustrate my invention that others may, by applying current or future knowledge, adopt the same for use under various conditions of service.

I claim:

1. A carrier assembly for testing RFID tags, the tags having front and back faces and a thickness that is the distance between the front and back faces, the carrier assembly comprising:
   a flat carrier comprising a carrier cut-out;
   a bottom glass plate;
   a flat spacer having a spacer cut-out that is larger than the faces of the tag;
   a resilient insert that fits inside said spacer cut-out;
   a top glass plate;
   a plate fastener;
   wherein the said bottom glass plate is placed over said carrier cut-out; said spacer is placed on top of said bottom plate with said spacer cut-out generally aligned with said carrier cut-out; said tag is placed inside said spacer cut-out; said resilient insert is placed on top of the tag; said top glass plate is placed on top of said spacer and said resilient insert; and said plate fastener compresses said flat carrier against said bottom glass plate, said bottom glass plate against said spacer and the tag, and said spacer and said resilient insert against said top glass plate.

2. The carrier assembly of claim 1, wherein said spacer is thicker than said tag thickness and the combination of the thickness of said resilient insert and the tag is greater than the thickness of said spacer.

3. The carrier assembly of claim 1 wherein said resilient insert provides a generally uniform pressure across the tag to produce consistent mechanical contact between the bottom glass and the tag.

4. The carrier assembly of claim 1, wherein said tag operates in an operating frequency range and said resilient insert is comprised of a material selected based on its dielectric properties to have a minimal effect on said tag in said tag operating frequency range.

5. The carrier assembly of claim 1, wherein said carrier and said spacer are made of a dielectric material.

6. The carrier assembly of claim 1, wherein said plate fastener comprises a plurality of threaded nylon fasteners that are adjustably tightened with nuts or wing nuts.

7. The carrier assembly of claim 1, wherein at least one dimension or material of at least one said flat carrier, bottom glass plate, flat spacer, resilient insert or top glass place that fits inside said spacer cut-out is selected by
   testing a plurality of tags on said carrier assembly to produce a first set of sensitivities for a first standard deviation;
   testing said plurality of tags by adhering them to glass to produce a second set of sensitivities for a second standard deviation; and selecting said dimension or material of said at least one of said flat carrier, bottom glass plate, flat spacer, resilient insert or top glass place that fits inside said spacer cut-out when said first standard deviation is the closest to said second standard deviation.

8. A tag testing system comprising:
   a tag carrier, the tag carrier comprising
      a carrier cut-out,
      a bottom glass plate,
      a flat spacer having a spacer cut-out that is larger than the faces of the tag,
      a resilient insert that fits inside said spacer cut-out,
      a top glass plate, and
      a plate fastener;
   an RF anechoic testing chamber;
   an antenna; and
   a tag interrogator;

wherein the said bottom glass plate is placed over said carrier cut-out; said spacer is placed on top of said bottom plate with said spacer cut-out generally aligned with said carrier cut-out; said tag is placed inside said spacer cut-out; said resilient insert is placed on top of the tag; said top glass plate is placed on top of said spacer and said resilient insert; and said plate fastener compresses said flat carrier against said bottom glass plate, said bottom glass plate against said spacer and the tag, and said spacer and said resilient insert against said top glass plate and wherein the tag is placed on said tag carrier inside said testing chamber and a signal is transmitted to the tag through said antenna by said tag interrogator and a signal is received from the tag by said interrogator through said antenna.

9. The tag testing system of claim 8 wherein said anechoic testing chamber is characterized with calibration constants at a plurality of frequencies.

10. A tag testing system, comprising
a tag carrier;
an RF anechoic testing chamber;
an antenna; and
a tag interrogator;
wherein the tag is placed on the tag carrier inside said testing chamber and a signal is transmitted to the tag through said antenna by said tag interrogator and a signal is received from the tag by said interrogator through said antenna,
wherein said anechoic testing chamber is characterized with calibration constants at a plurality of frequencies and
wherein said calibration constants are established by
measuring the sensitivities of a plurality of tags on said tag carrier in said RF anechoic testing chamber to produce a first set of sensitivities;
measuring the sensitivities of said plurality of tags adhered to glass in a reference test site to produce a second set of sensitivities and establishing said calibration constants to minimize the difference between said first and second sets of sensitivities.

11. A method for testing glass-mounted RFID tags comprising:
measuring first set of sensitivities of a plurality of sample RFID tags on a test carrier without adhering the tags to glass;
adhering said plurality of sample RFID tags to glass measuring second set of sensitivities of said plurality of sample RFID tags adhered to said glass;
deriving a calibration factor to relate said first and second sets of sensitivities,
measuring a production sensitivity of a production RFID tag on said test carrier; and
applying said calibration factors to said production sensitivity.

12. The method of claim 11 further comprising:
calculating a first standard deviation for said first set of sensitivities;
calculating a second standard deviation for said second set of sensitivities; and deriving said calibration factor based on said first and second standard deviations.

13. The method of claim 11, wherein said measuring of said first set of sensitivities is conducted at a plurality of frequencies and said measuring of said second set of sensitivities is conducted at a plurality of frequencies, and further comprising
calculating a first standard deviation at each of said plurality of frequencies for said first set of sensitivities so as to create a first set of standard deviations;
calculating a second standard deviation at each of said plurality of frequencies for said second set of sensitivities so as to create a second set of standard deviations; and deriving said calibration factor based on said first and second sets of standard deviations.

* * * * *